United States Patent [19]

Hack et al.

[11] Patent Number: 5,050,015
[45] Date of Patent: Sep. 17, 1991

[54] METHOD AND ARRANGEMENT FOR REDUCING WEAR IN A MAGNETIC STORAGE MEANS

[75] Inventors: Joachim Hack, Ludwigshafen; Werner Grau, Bobenheim-Roxheim; Werner Sickmueller, Sandhausen; Heinrich Mannsperger, Dossenheim; Helmut Jakusch, Frankenthal, all of Fed. Rep. of Germany

[73] Assignee: BASF Aktiengesellschaft, Ludwigshafen, Fed. Rep. of Germany

[21] Appl. No.: 422,457

[22] Filed: Oct. 17, 1989

[30] Foreign Application Priority Data

Oct. 22, 1988 [DE] Fed. Rep. of Germany ....... 3836129

[51] Int. Cl.⁵ .......................... G11B 21/02; G11B 5/55
[52] U.S. Cl. .................................................. 360/075
[58] Field of Search .......................................... 360/75

[56] References Cited

FOREIGN PATENT DOCUMENTS 55-43681  3/1980  Japan ..................................... 360/75
55-163668 12/1980 Japan ..................................... 360/75
56-00479  2/1981  PCT Int'l Appl. ................... 360/75

Primary Examiner—Vincent P. Canney
Assistant Examiner—Robertson, David L.
Attorney, Agent, or Firm—Keil & Weinkauf

[57] ABSTRACT

A method and an arrangement for reducing wear in magnetic storage means having magnetic disks, in particular having flexible media, become effective when predetermined maximum waiting times of the heads on the same track or the same tracks have elapsed. The heads HD are moved away from the waiting tracks in accordance with the predetermined control scheme, may be moved in waiting areas of the magnetic surface, and are moved back to the waiting position.

10 Claims, 1 Drawing Sheet

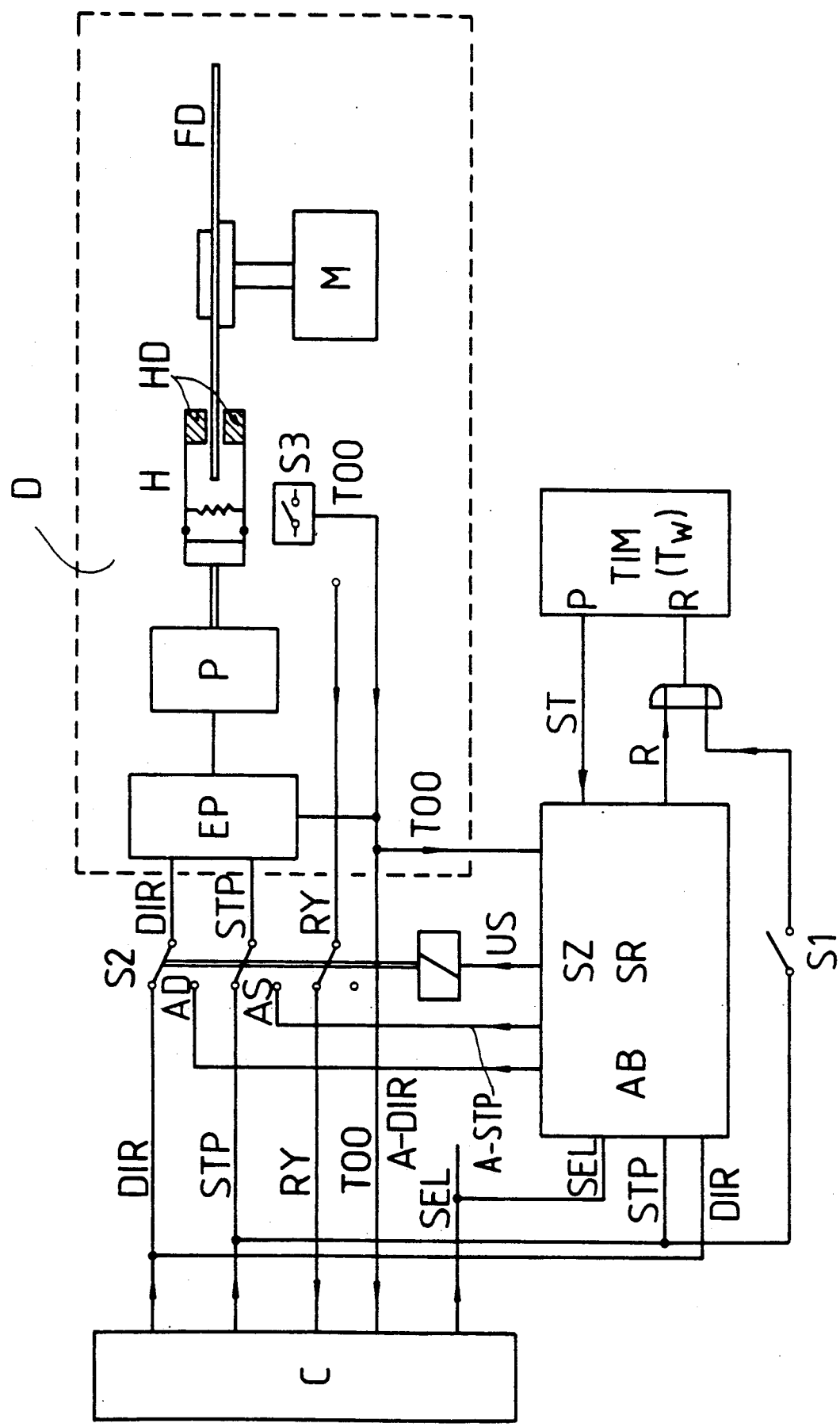

METHOD AND ARRANGEMENT FOR REDUCING WEAR IN A MAGNETIC STORAGE MEANS

The present invention relates to a method and an arrangement for reducing wear in a magnetic storage means having at least one magnetic head and at least one, in particular flexible, magnetic disk having a magnetic layer, write and read operations taking place during contact between the magnetic head and the magnetic layer in at least one magnetic track.

Magnetic disks, in particular FlexyDisks ® or diskettes or microfloppy disks having hard or extremely hard surfaces, possess, for example, chromium dioxide layers ($CrO_2$) or metal layers (eg. CoCr). Where small irregularities are present, particles are broken off by the heads, which are likewise very hard and consist of ferrite and/or ceramic particles. The particles which have been broken off are then frequently deposited in the adhesive joints between the individual components of the head or in the gap itself. These firmly deposited particles in turn scratch the surface of the magnetic disk or diskette, so that rapidly increasing damage occurs and may lead to destruction of diskettes and heads in a relatively short time. Protective layers applied to the disk or diskette surface as a remedy result in only a small improvement.

® is a registered trademark of BASF Aktiengesellschaft, Ludwigshafen, W-Germany

It is an object of the present invention to prevent such damage and thus increase the life of magnetic disks, diskettes and heads.

We have found that this object is achieved by a method for reducing wear in a magnetic storage means having at least one magnetic head and at least one, in particular flexible, magnetic disk having a magnetic layer, write and read operations taking place during contact between the magnetic head and the magnetic layer in at least one magnetic track, the said method comprising the following steps:

determining whether said at least one magnetic head which is in the waiting position is positioned on said at least one magnetic track (waiting track), determining if said magnetic head in the waiting position has exceeded a predetermined waiting time on said waiting track, moving the magnetic head away from said waiting track and, after said predetermined anti-wear time has elapsed, repositioning the head back onto said waiting track.

This prevents one or more magnetic heads which are positioned for a fairly long time on the same magnetic track in a rotating magnetic disk or diskette from causing and/or suffering avoidable damage.

In the novel measure of moving the magnetic head away, the head is advantageously moved radially across the disk or diskette surface, so that the wear and tear process described is interrupted and the abraded particles are removed by means of a cleaning layer usually provided on the envelope of the diskette (for example consisting of a fleece material) or by means of some other cleaning apparatuses in magnetic disks, the said particles being wiped off the head and being deposited in the fleece, so that they cause no damage.

This enables both the life of the magnetic head and the life of magnetic disks and diskettes to be substantially increased by a factor of 1,000 or more.

In a further embodiment of the novel method, the magnetic head can be moved away to an area of the magnetic layer other than that of said waiting track.

In a further embodiment, moving away and moving back (repositioning) may comprise one or more movements of the head across the entire magnetic layer and back to said waiting track.

According to the invention, it is also possible for the moving away of the magnetic head to comprise a movement of the head to one or more adjacent magnetic tracks.

Finally, it may also be advantageous if the other area of the magnetic layer is outside the usable area of the magnetic tracks.

An advantageous arrangement for carrying out the novel method comprises an electronic control unit for the head positioner, an anti-wear control circuit, essentially consisting of a magnetic track counter which indicates the current magnetic track on which the magnetic head is positioned, and a track register for storing the number of the current magnetic track, comprising a timer for determining and checking the maximum length of the waiting time and, after said waiting time has elapsed, for delivering a start signal to the anti-wear control circuit for producing control signals to predetermine an anti-wear time, which timer is then reset and started, and comprising a changeover switch which, controlled by a changeover signal, connects the electronic control unit of the positioner to the anti-wear control circuit for the duration of said predetermined anti-wear time, so that the repositioning steps of the magnetic head positioner are controlled only by said control signals produced by the anti-wear control circuit.

Thus, the novel method for reducing wear in magnetic storage means can be realized and can be employed without great expense in existing electronic means, so that retrofit is also possible.

The changeover switch advantageously generates a characteristic signal for avoiding write/read operations for the duration of said anti-wear time.

The ratio of anti-wear time to waiting time is advantageously from about 1:10 to about 1:400 or even less.

The invention is illustrated in detail below with reference to an embodiment of a circuit arrangement shown in a drawing.

The drawing shows a block circuit diagram of an anti-wear arrangement for a magnetic storage means.

DESCRIPTION

The function groups and signals which are already present in the case of a commercial FlexyDisk drive D will first be described:

The diskette or FlexyDisk FD is caused to rotate by the spindle motor M.

A positioner motor P, usually a stepping motor, moves the magnetic head system H radially across the surface of the FlexyDisk and to a desired track, the head HD or the heads HD being in contact with the magnetic layer of the FlexyDisk FD.

The electronic control unit EP of the positioner controls the positioner motor P.

The signal STP usually causes the head system H to be moved on by one track by the electronic control unit EP with the positioner, the signal DIR determining the direction of the positioning process.

Both signals are delivered by the controller or the computer system C. The signal T00 is generated in the drive D as soon as the head system H is located on track T00, and serves for resetting track counting.

The signal SEL activates a write or read operation of the drive D by the computer C.

The signal RY informs the computer C that drive D is ready to execute instructions.

The circuit represents the case where the computer system or controller C is carrying out normal write-/read operation.

The following additional means are required for the anti-wear function:

1. Anti-wear control circuit AB
2. Timer TIM
3. Changeover switch S2.

1. The anti-wear control circuit AB contains a track counter SZ, which runs synchronously with the stepping motor P and always indicates the current magnetic track (it is also reset by the track zero signal T00, which is generated by the track zero sensor S3), and a track register SR, which stores the number of the particular track on which the head HD is or was located during the waiting time TW. The circuit AB delivers the following signals:

a changeover signal US, which is present during the anti-wear time TA, control signals A-DIR and A-STP, which control the direction or the positioner step count of the repositioning movement sequences of the anti-wear cycle via the electronic control unit EP of the positioner, and the reset signal R, which resets the timer TIM and starts it again after the anti-wear cycle is complete.

The anti-wear control circuit AB in turn is driven by the following signals:

start signal ST from timer TIM, which the latter delivers after expiry of the waiting time TW.

Step count and direction signals. The signals STP and DIR control the track counter SZ contained in the control circuit AB.

The signals STP and DIR need not necessarily be delivered by the controller or the computer C; they may also be generated in the anti-wear control circuit, for example by means of a microprocessor.

The selection signal SEL of the controller or computer C serves as a blocking signal for the anti-wear control circuit AB and thus prevents an anti-wear cycle from starting during a write and read operation.

2. The timer TIM determines and check the waiting time TW between the anti-wear cycles and, after the said time has elapsed, delivers the start signal ST for the anti-wear control circuit AB, by which the anti-wear time is predetermined and control signals are produced. The timer TIM is reset and restarted by the reset signal R, either as a result of the predetermined anti-wear cycle coming to an end or, alternatively, by an STP signal during a normal positioning process, for example after the changeover switch S2 has been switched back to the state shown in the block circuit diagram.

3. The changeover switch S2, shown here as a relay switch, switches the inputs of the electronic control unit of the positioner from the interface of the controller or of the computer C to the anti-wear control circuit AB, and does so at the beginning of the anti-wear operation and for the duration of the said operation.

At the same time, the changeover switch S2 advantageously interrupts the free signal RY generated in the drive D, in order to inform the computer C that no write or read operation may be carried out at the moment.

The changeover switch S2 disconnects the positioner control circuit from the controller or computer C at the beginning of the anti-wear cycle and connects the input terminals of the electronic control unit EP of the positioner to the output terminals AD and AS at which the control signals A-DIR and A-STP are applied, by means of which the repositioning operations are controlled during the time TA.

The waiting and anti-wear times TW and TA, respectively, are of course primarily determined by the conditions under which the particular magnetic store is used. However, the following considerations may serve as guidelines:

In a practical example with 80 tracks and a positioning speed of 3 ms per track, positioning from a certain track across the entire surface and back to the waiting track takes slightly less than 0.5 second, and correspondingly less with higher positioning speeds.

The anti-wear time TA is advantageously about 0.2–10 seconds.

A waiting time TW is about $$10 \text{ sec} \leq TW \leq 1 \text{ hour},$$

depending on the specific use of the magnetic storage means in practice.

For the abovementioned values, the ratio $$\frac{TA}{TW} \text{ is } \frac{1}{50} \leq \frac{TA}{TW} \leq \frac{1}{360}$$

The anti-wear time TA is very small relative to the waiting time, so that operational readiness with respect to short access times is scarcely restricted.

In applications in which access should occur at regular time intervals, it is of course also possible to provide a periodic anti-wear cycle whose cycle time can be adapted to the length of said regular access time intervals.

In practice, it was found that the life of magnetic heads and of FlexyDisks provided with a CoCr layer were increased by a factor of from 100 to 1,000 or more.

A CoCr metal layer provided with a certain protective carbon layer achieved, for example, an average waiting time TW of 20 min (until destruction of the metal layer in the waiting track) without the use of the novel method.

When the invention was used, a waiting track could be subjected to 1 second scans for about 500 hours if the head was moved away to the inner track and moved back onto the same waiting track in between.

$$\frac{TA}{TW} \sim \frac{1}{10}$$

According to the present invention, the ratio TA/TW should be from about 1:10 to 1:400 or less.

In a modern FlexyDisk drive with microprocessor control, the tasks of the individual function groups can be realized by appropriate program control and virtually without any additional components.

We claim:

1. A method for reducing wear in a magnetic storage means having at least one magnetic head and at least one, in particular flexible, magnetic disk having a magnetic layer, write and read operations taking place during contact between the magnetic head and the magnetic layer in at least one magnetic track, comprising determining whether said at least one magnetic head which is in a waiting position is positioned on said at least one magnetic track (waiting track), determining if the magnetic head in the waiting position has exceeded a predetermined waiting time on said at least one waiting track, moving the magnetic head away from the at least one waiting track for a predetermined anti-wear time and, after said predetermined anti-wear time has elapsed, repositioning the magnetic head back onto the at least one waiting track.

2. A method as claimed in claim 1, wherein the magnetic head is moved away to an area of the magnetic layer other than that of said waiting track.

3. A method as claimed in claim 1, wherein said moving away and back of the magnetic head comprises at least one movement of the magnetic head radially across the entire magnetic layer and back to said waiting track.

4. A method as claimed in claim 1, wherein said moving away comprises a movement of the magnetic head to one of the two adjacent tracks.

5. A method as claimed in claim 1, wherein the magnetic head is moved away to an area of the magnetic layer other than that of said waiting track, and this other area of the magnetic layer is located outside the usable area of the magnetic tracks.

6. A method for reducing wear in a magnetic storage means having at least one magnetic head and at least one, in particular flexible, magnetic disk having a magnetic layer, write and read operations taking place during contact between the magnetic head and the magnetic layer in at least one magnetic track, comprising determining whether said at least one magnetic head which is in a waiting position is positioned on said at least one magnetic track (waiting track), determining if the magnetic head in the waiting position has exceeded a predetermined waiting time on said at least one waiting track, moving the magnetic head away from the at least one waiting track and, after said predetermined anti-wear time has elapsed, repositioning the magnetic head back onto the at least one waiting track, the ratio between the anti-wear time before repositioning of the magnetic head and said predetermined waiting time being from about 1:10 to about 1:400 or less.

7. A method for reducing wear in a magnetic storage means having at least one magnetic head and at least one, in particular flexible, magnetic disk having a magnetic layer, write and read operations taking place during contact between the magnetic head and the magnetic layer in at least one magnetic track, comprising determining whether said at least one magnetic head which is in a waiting position is positioned on said at least one magnetic track (waiting track), determining if the magnetic head in the waiting position has exceeded a predetermined waiting time on said at least one waiting track, moving the magnetic head away from the at least one waiting track to an area of the magnetic layer other than that of said waiting track and, after said predetermined anti-wear time has elapsed, repositioning the magnetic head back onto the at least one waiting track, the ratio between the anti-wear time before repositioning of the magnetic head and said predetermined waiting time being from about 1:10 to about 1:400 or less.

8. A method for reducing wear in a magnetic storage means having at least one magnetic head and at least one, in particular flexible, magnetic disk having a magnetic layer, write and read operations taking place during contact between the magnetic head and the magnetic layer in at least one magnetic track, comprising determining whether said at least one magnetic head which is in a waiting position is positioned on said at least one magnetic track (waiting track), determining if the magnetic head in the waiting position has exceeded a predetermined waiting time on said at least one waiting track, moving the magnetic head away from the at least one waiting track and, after said predetermined anti-wear time has elapsed, repositioning the magnetic head back onto the at least one waiting track, said moving away and back of the magnetic head comprising at least one movement of the magnetic head radially across the entire magnetic layer and back to said waiting track, the ratio between the anti-wear time before repositioning of the magnetic head and said predetermined waiting time being from about 1:10 to about 1:400 or less.

9. A method for reducing wear in a magnetic storage means having at least one magnetic head and at least one, in particular flexible, magnetic disk having a magnetic layer, write and read operations taking place during contact between the magnetic head and the magnetic layer in at least one magnetic track, comprising determining whether said at least one magnetic head which is in a waiting position is positioned on said at least one magnetic track (waiting track), determining if the magnetic head in the waiting position has exceeded a predetermined waiting time on said at least one waiting track, moving the magnetic head away from the at least one waiting track, said moving away comprising a movement of the magnetic head to one of the two adjacent tracks, and, after said predetermined anti-wear time has elapsed, repositioning the magnetic head back onto the at least one waiting track, the ratio between the anti-wear time before repositioning of the magnetic head and said predetermined waiting time being from about 1:10 to about 1:400 or less.

10. A method for reducing wear in a magnetic storage means having at least one magnetic head and at least one, in particular flexible, magnetic disk having a magnetic layer, write and read operations taking place during contact between the magnetic head and the magnetic layer in at least one magnetic track, comprising determining whether said at least one magnetic head which is in a waiting position is positioned on said at least one magnetic track (waiting track), determining if the magnetic head in the waiting position has exceeded a predetermined waiting time on said at least one waiting track, the magnetic head being moved away to an area of the magnetic layer other than that of said waiting track, and said other area of the magnetic layer being located outside the usable area of the magnetic tracks and, after said predetermined anti-wear time has elapsed, repositioning the magnetic head back onto the at least one waiting track, the ratio between the anti-wear time before repositioning of the magnetic head and said predetermined waiting time being from about 1:10 to about 1:400 or less.

* * * * *